US011107110B2

(12) United States Patent
Rose (10) Patent No.: US 11,107,110 B2
(45) Date of Patent: Aug. 31, 2021

(54) CUSTOMER DATA AGGREGATION

(71) Applicant: Square, Inc., San Francisco, CA (US)

(72) Inventor: Cody Rose, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 16/370,813

(22) Filed: Mar. 29, 2019

(65) Prior Publication Data
US 2019/0228431 A1  Jul. 25, 2019

Related U.S. Application Data

(63) Continuation of application No. 14/230,286, filed on Mar. 31, 2014, now Pat. No. 10,290,016.
(Continued)

(51) Int. Cl.
*G06Q 30/00* (2012.01)
*G06Q 30/02* (2012.01)
(Continued)

(52) U.S. Cl.
CPC ......... *G06Q 30/0226* (2013.01); *G06Q 10/02* (2013.01); *G06Q 20/102* (2013.01); *G06Q 20/14* (2013.01); *G06Q 20/20* (2013.01); *G06Q 20/3223* (2013.01); *G06Q 20/3224* (2013.01); *G06Q 30/04* (2013.01);
(Continued)

(58) Field of Classification Search
CPC ........... G06Q 30/0226; G06Q 30/0631; G06Q 20/102; G06Q 20/14; G06Q 20/3223; G06Q 50/12

See application file for complete search history.

(56) References Cited

U.S. PATENT DOCUMENTS 6,003,013 A   12/1999  Boushy et al.
6,266,649 B1   7/2001  Linden et al.
(Continued)

FOREIGN PATENT DOCUMENTS

WO     01/37183 A1    5/2001

OTHER PUBLICATIONS

"Uber-Android Apps on Google Play," dated Nov. 10, 2014, Retrieved from the Internet URL:https://play.google.com/store/apps/details?id=com.ubercab&hl=en, on Nov. 12, 2014, pp. 1-2.
(Continued)

*Primary Examiner* — Scott C Anderson
(74) *Attorney, Agent, or Firm* — Polsinelli PC (57) ABSTRACT

An aggregating server obtains information about a method of payments by a customer and aggregate all instances of payment by that customer with respect to one or more merchants. That is, the server can associate various methods of payment at a merchant with the same customer (e.g. credit card information, information associated with a digital wallet application payment, device identifier along with geofence data, etc.) Thereafter, information at the server regarding frequency of visits, money spent, menu preferences, etc. can also be shared with the merchant in order to provide information for increasing customer satisfaction during further visits by the customer. Also, the server can determine whether the customer qualifies for a loyalty or discount programs based on past visits.

20 Claims, 7 Drawing Sheets

Related U.S. Application Data (60) Provisional application No. 61/896,618, filed on Oct. 28, 2013.

(51) Int. Cl.

| | | |
|---|---|---|
| *G06Q 50/12* | (2012.01) | |
| *G06Q 30/04* | (2012.01) | |
| *G06Q 20/32* | (2012.01) | |
| *G06Q 20/10* | (2012.01) | |
| *G06Q 10/02* | (2012.01) | |
| *G06Q 20/14* | (2012.01) | |
| *G06Q 20/20* | (2012.01) | |
| *G06Q 30/06* | (2012.01) | |

(52) U.S. Cl.
CPC ......... *G06Q 30/0631* (2013.01); *G06Q 50/12* (2013.01); *G06Q 20/145* (2013.01)

(56) References Cited

U.S. PATENT DOCUMENTS

| | | | |
|---|---|---|---|
| 6,513,015 B2 | 1/2003 | Ogasawara | |
| 6,694,300 B1 | 2/2004 | Walker et al. | |
| 7,783,549 B1* | 8/2010 | Benson | G06Q 40/06 705/36 R |
| 7,818,399 B1 | 10/2010 | Ross, Jr. et al. | |
| 7,962,361 B2 | 6/2011 | Ramchandani et al. | |
| 8,145,531 B1 | 3/2012 | Ptak et al. | |
| 8,175,908 B1 | 5/2012 | Anderson | |
| 8,667,074 B1 | 3/2014 | Farkas | |
| 8,706,554 B1 | 4/2014 | Whitler | |
| 8,712,855 B1 | 4/2014 | Weigman et al. | |
| 9,619,831 B1 | 4/2017 | Kumar et al. | |
| 9,767,471 B1 | 9/2017 | Perrone et al. | |
| 9,916,562 B1 | 3/2018 | Armato | |
| 10,290,016 B1 | 5/2019 | Rose | |
| 10,304,117 B2 | 5/2019 | Kumar et al. | |
| 10,740,822 B1 | 8/2020 | Bebawy et al. | |
| 2002/0010617 A1 | 1/2002 | Harnaguchi et al. | |
| 2002/0082920 A1 | 6/2002 | Austin et al. | |
| 2002/0087384 A1 | 7/2002 | Neifeld | |
| 2003/0009705 A1 | 1/2003 | Thelander et al. | |
| 2003/0212601 A1 | 11/2003 | Silva et al. | |
| 2005/0038706 A1* | 2/2005 | Yazdani | G06Q 10/06 705/17 |
| 2005/0038893 A1 | 2/2005 | Graham | |
| 2005/0246740 A1 | 11/2005 | Teraci et al. | |
| 2005/0256782 A1 | 11/2005 | Sands | |
| 2006/0133317 A1 | 6/2006 | Hurtta | |
| 2006/0253321 A1 | 11/2006 | Heywood | |
| 2007/0179836 A1 | 8/2007 | Juang et al. | |
| 2008/0103888 A1 | 5/2008 | Weir | |
| 2008/0249837 A1 | 10/2008 | Angell et al. | |
| 2009/0006188 A1 | 1/2009 | Guo et al. | |
| 2009/0028183 A1 | 1/2009 | Landers et al. | |
| 2009/0076898 A1 | 3/2009 | Wang et al. | |
| 2009/0094237 A1 | 4/2009 | Churi et al. | |
| 2009/0150193 A1 | 6/2009 | Hong et al. | |
| 2009/0157472 A1 | 6/2009 | Burazin et al. | |
| 2009/0271275 A1 | 10/2009 | Regmi et al. | |
| 2010/0222036 A1 | 9/2010 | Wormald et al. | |
| 2010/0228593 A1 | 9/2010 | Belwadi et al. | |
| 2010/0274566 A1 | 10/2010 | Carlson | |
| 2010/0274680 A1 | 10/2010 | Carlson et al. | |
| 2010/0280880 A1 | 11/2010 | Faith et al. | |
| 2011/0022463 A1 | 1/2011 | Harris | |
| 2011/0035278 A1 | 2/2011 | Fordyce, III et al. | |
| 2011/0035288 A1 | 2/2011 | Clyne | |
| 2011/0082729 A1* | 4/2011 | Carvallo | G06Q 30/02 705/14.13 |
| 2011/0106607 A1 | 5/2011 | Alfonso et al. | |
| 2011/0119132 A1 | 5/2011 | Morton et al. | |
| 2011/0125566 A1 | 5/2011 | McLaughlin et al. | |
| 2011/0145628 A1 | 6/2011 | Wilson et al. | |
| 2011/0191142 A1 | 8/2011 | Huang et al. | |
| 2011/0231257 A1 | 9/2011 | Winters | |
| 2011/0231305 A1* | 9/2011 | Winters | G06Q 20/10 705/39 |
| 2011/0231819 A1 | 9/2011 | Tanner et al. | |
| 2011/0238474 A1 | 9/2011 | Carr et al. | |
| 2011/0251888 A1 | 10/2011 | Faith et al. | |
| 2011/0264501 A1 | 10/2011 | Clyne | |
| 2011/0264581 A1 | 10/2011 | Clyne | |
| 2011/0302016 A1* | 12/2011 | Haddad | G06Q 30/0224 705/14.25 |
| 2012/0059911 A1 | 3/2012 | Randhawa et al. | |
| 2012/0143700 A1 | 6/2012 | Bhattacharya et al. | |
| 2012/0173427 A1 | 7/2012 | Sparks | |
| 2012/0239504 A1 | 9/2012 | Curlander et al. | |
| 2012/0271691 A1 | 10/2012 | Hammad et al. | |
| 2012/0271715 A1 | 10/2012 | Morton et al. | |
| 2012/0278139 A1 | 11/2012 | Mercuri et al. | |
| 2012/0290349 A1 | 11/2012 | Burkhart et al. | |
| 2012/0310838 A1 | 12/2012 | Harris et al. | |
| 2013/0018785 A1 | 1/2013 | Dolphin et al. | |
| 2013/0024307 A1 | 1/2013 | Fuerstenberg et al. | |
| 2013/0030915 A1 | 1/2013 | Statler et al. | |
| 2013/0031006 A1 | 1/2013 | McCullagh et al. | |
| 2013/0046626 A1 | 2/2013 | Grigg et al. | |
| 2013/0046717 A1 | 2/2013 | Grigg et al. | |
| 2013/0124417 A1 | 5/2013 | Spears et al. | |
| 2013/0132140 A1 | 5/2013 | Amin et al. | |
| 2013/0132246 A1 | 5/2013 | Amin et al. | |
| 2013/0132283 A1 | 5/2013 | Hayhow et al. | |
| 2013/0132887 A1 | 5/2013 | Amin et al. | |
| 2013/0159110 A1 | 6/2013 | Rajaram et al. | |
| 2013/0246120 A1 | 9/2013 | Chang et al. | |
| 2013/0246207 A1 | 9/2013 | Novak et al. | |
| 2013/0246301 A1 | 9/2013 | Radhakrishnan et al. | |
| 2013/0254008 A1* | 9/2013 | Ovick | G06Q 30/0225 705/14.26 |
| 2013/0262226 A1 | 10/2013 | LaChapelle et al. | |
| 2013/0262295 A1 | 10/2013 | Narayanan | |
| 2013/0262307 A1 | 10/2013 | Fasoli et al. | |
| 2013/0275266 A1* | 10/2013 | Goff | G06Q 30/0233 705/26.44 |
| 2013/0346170 A1 | 12/2013 | Epstein et al. | |
| 2014/0047101 A1 | 2/2014 | Nix et al. | |
| 2014/0089133 A1 | 3/2014 | Argue et al. | |
| 2014/0095259 A1* | 4/2014 | Weiss | G06Q 30/0225 705/7.32 |
| 2014/0108256 A1 | 4/2014 | Bircher-Nagy et al. | |
| 2014/0129135 A1 | 5/2014 | Holden et al. | |
| 2014/0129302 A1 | 5/2014 | Amin et al. | |
| 2014/0129951 A1 | 5/2014 | Amin et al. | |
| 2014/0156449 A1 | 6/2014 | Ganesan et al. | |
| 2014/0172537 A1* | 6/2014 | Weigman | G06Q 20/22 705/14.35 |
| 2014/0214562 A1 | 7/2014 | Cancro et al. | |
| 2014/0214572 A1 | 7/2014 | Cancro et al. | |
| 2014/0229323 A1 | 8/2014 | Or et al. | |
| 2014/0236669 A1 | 8/2014 | Milton et al. | |
| 2014/0240725 A1 | 8/2014 | Banfield et al. | |
| 2014/0278609 A1 | 9/2014 | Capps | |
| 2014/0279015 A1 | 9/2014 | Root et al. | |
| 2014/0344093 A1 | 11/2014 | Du et al. | |
| 2014/0365301 A1 | 12/2014 | Rappoport et al. | |
| 2015/0051994 A1 | 2/2015 | Ward et al. | |
| 2015/0095219 A1 | 4/2015 | Hurley | |
| 2015/0095228 A1 | 4/2015 | Su et al. | |
| 2015/0120433 A1 | 4/2015 | Chaouki et al. | |
| 2015/0142551 A1 | 5/2015 | Papakipos et al. | |
| 2015/0170300 A1 | 6/2015 | Wilson et al. | |
| 2015/0187021 A1 | 7/2015 | Moring et al. | |
| 2015/0206087 A1 | 7/2015 | Tavares | |
| 2015/0220999 A1 | 8/2015 | Thornton et al. | |
| 2015/0248694 A1 | 9/2015 | Chandra | |
| 2015/0262221 A1 | 9/2015 | Nakano et al. | |
| 2015/0269642 A1 | 9/2015 | Cai et al. | |
| 2015/0287077 A1 | 10/2015 | Celikyilmaz et al. | |
| 2015/0317681 A1 | 11/2015 | Zamer et al. | |
| 2016/0012465 A1 | 1/2016 | Sharp | |
| 2016/0042387 A1 | 2/2016 | Blackhurst et al. | |
| 2016/0086217 A1 | 3/2016 | Loomis | |

(56) References Cited

U.S. PATENT DOCUMENTS

| | | |
|---|---|---|
| 2016/0086257 A1 | 3/2016 | Collins et al. |
| 2016/0180393 A1 | 6/2016 | Mulye |
| 2016/0255040 A1 | 9/2016 | Howe |
| 2016/0255044 A1 | 9/2016 | Howe |
| 2017/0098286 A1 | 4/2017 | Gould et al. |
| 2017/0103392 A1 | 4/2017 | Morre et al. |
| 2017/0169497 A1 | 6/2017 | Lee et al. |
| 2017/0372345 A1 | 12/2017 | Shastry |
| 2019/0228455 A1 | 7/2019 | Kumar et al. |

OTHER PUBLICATIONS

Non-Final Office Action dated Feb. 21, 2014, for U.S. Appl. No. 13/682,488, of Dorogusker, J., filed Nov. 20, 2012.
Non-Final Office Action dated Jul. 16, 2014, for U.S. Appl. No. 13/682,488, of Dorogusker, J., filed Nov. 20, 2012.
Final Office Action dated Dec. 5, 2014, for U.S. Appl. No. 13/682,488, of Dorogusker, J., filed Nov. 20, 2012.
Non-Final Office Action dated Jul. 15, 2015, for U.S. Appl. No. 13/682,488, of Dorogusker, J., filed Nov. 20, 2012.
Non-Final Office Action dated Dec. 14, 2015, for U.S. Appl. No. 14/230,286, of Rose, C., filed Mar. 31, 2014.
Final Office Action dated Jan. 8, 2016, for U.S. Appl. No. 13/682,488, of Dorogusker, J., filed Nov. 20, 2012.
Final Office Action dated Jul. 21, 2016, for U.S. Appl. No. 14/230,286, of Rose, C., filed Mar. 31, 2014.
Non-Final Office Action dated Jul. 28, 2016, for U.S. Appl. No. 14/289,469, of Kumar, A., et al., filed May 28, 2014.
Non-Final Office Action dated Jul. 29, 2016, for U.S. Appl. No. 14/284,980, of Perrone, G., et al., filed May 22, 2014.
Non-Final Office Action dated Sep. 9, 2016, for U.S. Appl. No. 13/682,488, of Dorogusker, J., filed Nov. 20, 2012.
Non-Final Office Action dated Dec. 19, 2016, for U.S. Appl. No. 14/289,443, of Kumar, A., et al., filed May 28, 2014.
Final Office Action dated Dec. 21, 2016, for U.S. Appl. No. 14/284,980, of Perrone, G., et al., filed May 22, 2014.
Notice of Allowance dated Dec. 23, 2016, for U.S. Appl. No. 14/289,469, of Kumar, A., et al., filed May 28, 2014.
Final Office Action dated Dec. 28, 2016, for U.S. Appl. No. 13/682,488, of Dorogusker, J., filed Nov. 20, 2012.
Advisory Action dated Feb. 22, 2017, for U.S. Appl. No. 14/284,980, of Perrone, G., et al., filed May 22, 2014.
Non-Final Office Action dated Apr. 3, 2017, for U.S. Appl. No. 14/230,286, of Rose, C., filed Mar. 31, 2014.
Advisory Action dated Apr. 13, 2017, for U.S. Appl. No. 13/682,488, of Dorogusker, J., filed Nov. 20, 2012.
Advisory Action dated May 1, 2017, for U.S. Appl. No. 13/682,488, of Dorogusker, J., filed Nov. 20, 2012.
Notice of Allowance dated May 22, 2017, for U.S. Appl. No. 14/284,980, of Perrone, G., et al., filed May 22, 2014.
Non-Final Office Action dated Jun. 27, 2017, for U.S. Appl. No. 14/691,151, of Hartard, B., et al., filed Apr. 20, 2015.
Non-Final Office Action dated Jul. 27, 2017, for U.S. Appl. No. 14/546,541, of Wikman, C.S., et al., filed Nov. 18, 2014.
Final Office Action dated Sep. 22, 2017, for U.S. Appl. No. 14/230,286, of Rose, C., filed Mar. 31, 2014.
Final Rejection dated Dec. 6, 2017, for U.S. Appl. No. 14/289,443, of Kumar, A., et al., filed May 28, 2014.
Final Office Action dated Jan. 17, 2018, for U.S. Appl. No. 14/691,151, of Hartard, B., et al., filed Apr. 20, 2015.
Non-Final Office Action dated Feb. 1, 2018, for U.S. Appl. No. 13/682,488, of Dorogusker, J., filed Nov. 20, 2012.
Advisory Action dated Feb. 28, 2018, for U.S. Appl. No. 14/230,286, of Rose, C., filed Mar. 31, 2014.
Advisory Action dated Mar. 22, 2018, for U.S. Appl. No. 14/691,151, of Hartard, B., et al., filed Apr. 20, 2015.
Non-Final Office Action dated Apr. 4, 2018, for U.S. Appl. No. 14/289,443, of Kumar, A., et al., filed May 28, 2014.
Non-Final Office Action dated Jun. 8, 2018, for U.S. Appl. No. 14/230,286, of Rose, C., filed Mar. 31, 2014.
Final Office Action dated Jun. 13, 2018, for U.S. Appl. No. 13/682,488, of Dorogusker, J., filed Nov. 20, 2012.
Advisory Action dated Aug. 24, 2018, for U.S. Appl. No. 13/682,488, of Dorogusker, J., filed Nov. 20, 2012.
Final Office Action dated Oct. 18, 2018, for U.S. Appl. No. 14/546,541, of Wikman, C.S., et al., filed Nov. 18, 2014.
Final Office Action dated Nov. 14, 2018, for U.S. Appl. No. 14/289,443, of Kumar, A., et al., filed May 28, 2014.
Non-Final Office Action dated Nov. 27, 2018, for U.S. Appl. No. 15/365,902, of Zigoris, P., et al., filed Nov. 30, 2016.
Non-Final Office Action dated Dec. 12, 2018, for U.S. Appl. No. 14/691,151, of Hartard, B., et al., filed Apr. 20, 2015.
Notice of Allowance dated Dec. 28, 2018, for U.S. Appl. No. 14/230,286, of Rose, C., filed Mar. 31, 2014.
Notice of Allowance dated Jan. 7, 2019, for U.S. Appl. No. 15/445,619, of Kumar, A., et al., filed Feb. 28, 2017.
Advisory Action dated Feb. 14, 2019, for U.S. Appl. No. 14/289,443, of Kumar, A., et al., filed May 28, 2014.
Final Office Action dated Apr. 10, 2019, for U.S. Appl. No. 15/365,902, of Zigoris, P., et al., tiled Nov. 30, 2016.
Non-Final Office Action dated May 16, 2019, for U.S. Appl. No. 14/546,541, of Wikman, C.S., et al., filed Nov. 18, 2014.
Non-Final Office Action dated May 30, 2019, for U.S. Appl. No. 14/289,443, of Kumar, A., et al., filed May 28, 2014.
Final Office Action dated Jun. 3, 2019, for U.S. Appl. No. 14/691,151, of Hartard, B., et al., filed Apr. 20, 2015.
Non-Final Office Action dated Jul. 29, 2019, for U.S. Appl. No. 15/383,891, of Bebawy, R., et al., filed Dec. 19, 2016.
Advisory Action dated Aug. 1, 2019, for U.S. Appl. No. 15/365,902, of Zigoris, P., et al., tiled Nov. 30, 2016.
Advisory Action dated Aug. 9, 2019, for U.S. Appl. No. 14/691,151, of Hartard, B., et al., filed Apr. 20, 2015.
Final Office Action dated Nov. 26, 2019, for U.S. Appl. No. 14/546,541, of Wikman, C.S., et al., filed Nov. 18, 2014.
Non-Final Office Action dated Jan. 2, 2020, for U.S. Appl. No. 14/691,151, of Hartard, B., et al., filed Apr. 20, 2015.
Final Office Action dated Jan. 3, 2020, for U.S. Appl. No. 15/383,891, of Bebawy, R., et al., filed Dec. 19, 2016.
Advisory Action dated Jan. 28, 2020, for U.S. Appl. No. 14/546,541, of Wikman, C.S., et al., filed Nov. 18, 2014.
Non-Final Office Action dated Feb. 20, 2020, for U.S. Appl. No. 15/365,902, of Zigoris, P., et al., filed Nov. 30, 2016.
Advisory Action dated Mar. 3, 2020, for U.S. Appl. No. 15/383,891, of Bebawy, R., et al., filed Dec. 19, 2016.
Non-Final Office Action dated Mar. 6, 2020, for U.S. Appl. No. 14/546,541, of Wikman, C.S., et al., filed Nov. 18, 2014.
Notice of Allowance dated Mar. 30, 2020, for U.S. Appl. No. 15/383,891, of Bebawy, R., et al., tiled Dec. 19, 2016.
Final Office Action dated Apr. 15, 2020, for U.S. Appl. No. 14/691,151, of Hartard, B., et al., filed Apr. 20, 2015.
Final Office Action dated Jul. 1, 2020 for U.S. Appl. No. 15/365,902, of Zigoris, P., et al., filed Nov. 30, 2016.
Final Office Action dated Apr. 30, 2020, for U.S. Appl. No. 14/289,443, of Kumar, A., et al., filed May 28, 2014.
Notice of Allowance dated Jun. 10, 2020, for U.S. Appl. No. 16/369,455, of Kumar, A., et al. filed Mar. 29, 2019.
Final Office Action dated Jul. 1, for U.S. Appl. No. 15/365,902, of Zigoris, P., et al., filed Nov. 30, 2016.
Final Office Action dated Jul. 16, 2020, for U.S. Appl. No. 14/546,541, of Wikman, C.S., et al., filed Nov. 18, 2014.

* cited by examiner

CUSTOMER DATA AGGREGATION

CROSS-REFERENCE TO RELATED APPLICATIONS

The application is a continuation of U.S. application Ser. No. 14/230,286, filed Mar. 31, 2014, entitled "CUSTOMER DATA AGGREGATION", which claims the benefit of U.S. Provisional Patent Application No. 61/896,618, entitled "RESERVATION AND WAITLIST MANAGEMENT", filed on Oct. 28, 2013; of which the full disclosures of these applications are incorporated herein by reference for all purposes.

BACKGROUND

In general, the process for a customer to join a loyalty program for a merchant is based on the user registering with the merchant to obtain a customer identifier. Thereafter, the customer can present the customer identifier each time the customer visits the merchant so that the transaction is associated with the registered customer. In some cases, the merchant can use the customer identifier to collect information regarding a registered customer's various transactions with the merchant. Thereafter, the merchant can identify purchase recommendations for the customer based on their previous transactions or even offer rewards or discounts for future transactions to the customer.

With respect to providing recommendations to customers, a major limitation is that conventional loyalty card programs rely on the customer presenting his loyalty card during each and every visit. Often, customer may not have their loyalty card on their person or may simply forget to present the card. Even worse, a customer may have various loyalty cards. Further, some loyalty cards or loyalty card accounts may be shared by several customers. Thus the data collected during past uses of a loyalty card may be inaccurate in many cases.

Another major limitation of existing loyalty programs is that merchants are generally limited with regards to how to identify new customers for the loyalty program. Typically, merchants use conventional advertising methods. For example, the merchants can place advertisements, in print or electronic, regarding such loyalty programs to a targeted demographic group in the hope that it reaches an interested customer. In other cases, the agents of the merchant can contact customers currently at the merchant's establishment and inquire their status regarding the merchant's loyalty program. In the case they have not joined, the agents can offer the customer chance to do so. However, such methods are generally inefficient, as they are designed to target the public at large and not those customers who could take advantage of the loyalty program or who have a high interest in the loyalty program.

DETAILED DESCRIPTION

The present technology is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present technology is not limited by the illustrated ordering of acts or events, as some acts can occur in different orders and/or concurrently with other acts or events. Furthermore, not all illustrated acts or events are required to implement a methodology in accordance with the present technology.

The present technology involves systems, methods, and computer-readable mediums for implementing an aggregating server, in communication with point-of-sale (POS) terminals of merchants, which can collect information about methods of payment by a customer with the merchants and aggregate all instances of payment by that customer for each of the various merchants. The aggregating service can be associated with a payment service system that manages transaction sessions between merchants and customers and transfer of funds between financial institutions associated with the merchants and customers. For example, an aggregating server of a payment service system can associate various methods of payment with the same user (e.g. credit card information, information associated with a digital wallet application payment, device identifier along with geofence data, etc.). Therefore, an aggregating server associated with a payment service system leverages available information regarding different forms of payment known to be associated with the customer to identify a more complete set of transactions that can then be used to characterize the customer's behaviors with respect to one or more merchants.

In one aspect of the present technology, the identified set of transactions can be used by the aggregating server to more accurately determine whether the user qualifies for a loyalty program, discount program, or other benefits with the merchant. The aggregating server can make this determination based on the user's behavior associated with a merchant or, in some cases, a partner of the merchant. For example, the aggregating server can determine whether a customer has made a threshold number of visits to the merchant within a time period, spent a threshold amount of money at the merchant within a time period, or has made a threshold number of purchases from the merchant within a time period. Once this determination has been made, the applicable merchant programs can be presented at the POS terminal during a transaction or event involving the user. The user can then be informed of the available programs by the merchant's agents and can be provided the opportunity to enroll or take advantage of the program. In some cases, the user can be automatically enrolled or pre-enrolled (requiring the user to confirm enrollment). Similarly, any discounts can be automatically applied.

Accordingly, in one aspect, systems, methods, and computer-readable mediums for managing merchant programs involves communicating to an aggregating server, from a POS terminal, a request to obtain merchant program information for a customer. In some cases, the aggregating server can be part of a payment service system and any request by a merchant to perform a transaction or begin a transaction session with the customer via the payment service system can be also considered to be a request to obtain merchant program information for the customer. For example, the merchant can indicate to the aggregating server that a customer has arrived at the merchant's establishment and has begun a transaction (e.g., placed an order using a POS terminal).

In response to this request, the aggregating server can obtain a merchant profile that identifies any programs associated with the merchant. These can include loyalty programs, discount programs, or any other programs that merchants can be currently running for their customers. Additionally, the aggregating server can collect information regarding prior customer transactions to assemble a customer profile or other record or information associated with the customer. Once the aggregating server has the customer and merchant profiles, the aggregating server can then determine whether any of the merchant programs can be offered to the customer by comparing the profiles. If any programs can be offered, the information regarding the programs can be delivered to the POS terminal.

In the various implementations of the method, the customer and merchant profiles can be assembled with respect to particular sets of characteristics. The characteristics can include, but are not limited to, demographic characteristics, geo-location characteristics, non-financial behavioral characteristics, and financial behavioral characteristics. In some cases, these characteristics can be expressed as values within the profiles. Thus, aggregating server can also include logic for converting transaction information to such values.

In the various implementations, the request from the POS terminal provides at least one identifier associated with the customer. The customer profile is then assembled by the aggregating service by searching for other transactions at the merchant (or the merchant's partners) that are associated with this same identifier. However, the identifiers in the request can also be used by the aggregating server to identify additional identifiers for the customer. Thus, any transactions associated with the additional customer identifiers can be used to further enhance the customer profile.

In another aspect of the present technology, there are also systems, methods, and computer-readable mediums for improving a customer experience with a merchant. In particular, the information at the aggregating server regarding about a particular customer's frequency of visits, money spent, menu preferences, etc., can also be sent to the merchant when the customer is detected at the merchant establishment(s). This information can then be used by the merchant to increase customer satisfaction during the customer's visit.

This method involves communicating to an aggregating server, from a POS terminal, a request to obtain customer information. As previously described, the aggregating server can be part of a payment service system and any request by a merchant to perform a transaction or begin a transaction session with the customer via the payment service system can be also considered to be a request to obtain customer information. For example, the merchant can indicate to the aggregating server that a customer has arrived at the merchant's establishment and has begun a transaction (e.g., placed an order using a POS terminal).

This method also involves assembling a customer profile or other record or information regarding the trends and attributes of the customer with respect to one or more merchants, such as a record of past transactions. As previously noted, this involves accessing stored information regarding prior customer transactions with the merchant (or the merchant's partners), such as goods and services previously purchased by the customer, merchant reviews and ratings by the customer, or any other type of information that can be of use by merchant's agents to improve the customer's experience. Thus, the method can involve providing logic for assembling the disparate customer information into a summarized form that indicates the preferences of the customer with regards to goods and services available from the merchant. This customer profile can then be delivered to the merchant, along with other transaction information, for use in servicing the customer.

In some implementations, a request from the POS terminal provides identifiers associated with the customer that indicate, or can be used to determine, an identity of the customer. As previously described, the customer profile can then assembled by the aggregating service by searching for transactions at the merchant or the merchant's partners that are associated with the same identifier or by using the identifier to identify additional identifiers for the customer (i.e., alternate identities of the customer at the payment system), and thus additional transactions for the customer profile.

The types of information that can be delivered to a merchant POS terminal can include, but are not limited to, a relative priority of the customer to the merchant, purchase recommendations, discounts associated with the customer, or a loyalty program associated with the customer.

It should be noted that while the assembling and comparison of customer profiles and merchant profiles is described above as occurring in the aggregating server, in some implementations, some or all of the assembling and comparing can also be performed within the merchant's systems. Further, the transaction information is not be limited solely to that within the aggregating server. Rather, a request from a merchant can include supplemental customer transaction information or even identify alternate sources of transaction information for the customer or the merchant.

It should be further noted that to protect the privacy of the customer and the security of the customer's financial information, it is contemplated that any customer information delivered to the merchant can be limited in some implementations. That is, detailed information regarding the various transactions and utilized to form the customer profiles are not provided to the merchant. For example, in the case of a recommendation for a loyalty program or a discount program, the merchant can receive information that the customer qualifies and the basic qualifications for such program, but would receive no detailed information as to why or how the customer qualifies for such programs. In another example, in the case of forwarding customer information to a merchant for improving service, the customer information can be provided in a summarized form, without any specifics of the specific transactions leading to the inclusion of particular information or a recommendation. Moreover, it is also contemplated that a customer associated with a payment service system can opt out to prevent any aggregating of customer transaction data.

Figure 1:
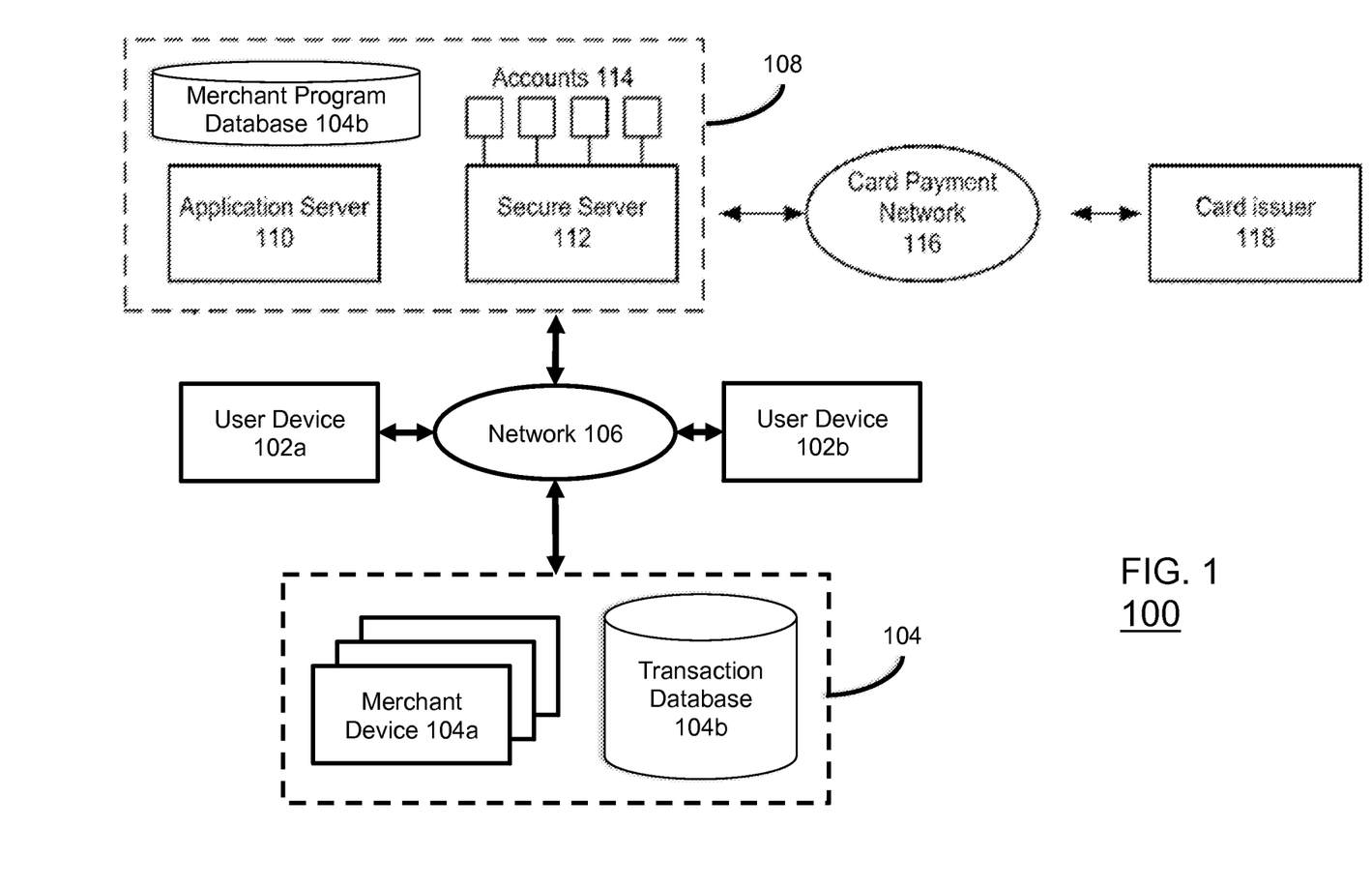
FIG. 1 is a schematic illustration of an architecture of an example cardless payment system 100 supporting aggregating of customer information and generating customer recommendations in accordance with the present technology.

As noted above, the methods described herein involve the establishment of communications between devices associated with customers, merchants, and an aggregating server. One implementation of a system supporting such communications is illustrated in FIG. 1. In particular, FIG. 1 is a schematic illustration of an architecture of an example payment service system 100 supporting management of customer information for merchant programs and the like.

The overall system 100 includes at least one user device 102a, 102b and at least one merchant system 104 connected to a network, e.g., the Internet 106. Each of user devices 102a, 102b can be a mobile computing device, i.e., a hand-held computing device, capable of running a user application. For example, the user device 102a can be a smartphone or tablet computer. However, in some implementations, the user devices 102a, 102 are not limited to hand-held devices. That is, customer interactions can occur at other types of devices not shown, including desktop computers, laptop computers, game consoles, set-top boxes, or other devices. It is also contemplated that a customer can utilize two devices, such as user devices 102a and 102b, for providing cardless payments for different transactions.

The merchant system 104 is also a computing device, capable of running a merchant application. The merchant system 104 can be a mobile device, or it can be a desktop computer, a laptop computer, a dedicated point of sale system, or other data processing apparatus. Further, the merchant system 104 can include at least one merchant terminal 104a and a merchant transaction database 104b. The merchant system 104 can be implemented in a localized or distributed fashion. Moreover, it is also contemplated that one or more components of the merchant system 104 can be mobile (e.g., repairmen and other service personnel that visit customers to provide goods and services).

A cardless payment processor operates a payment service system 108. The user and merchant devices can communicate with the payment service system 108 using the network 106. The payment service system 108 includes an application server 110 and a secure server 112 to processes all transactions between the user devices 102a, 102b and merchant system 104.

In general, the application server 110 handles non-secure information. For example, it can store public merchant information such as the merchant's address or phone number. The application server 110 can also be responsible for transferring or updating the user application to the user device 102 or transferring or updating the merchant application to the merchant's computing device. In particular, the application server 112 can be responsible for sending information about merchants that have accounts with the payment service system to the user device 102. The secure server 112 handles secure information such as credit card numbers, debit card numbers, bank accounts, user accounts, user identifying information or other sensitive information.

The payment service system 108 can communicate electronically with a card payment system or network 116, e.g., Visa, Mastercard, or the like. The payment service system 108 can communicate with a computer system 116 over the same network 106 used to communicate with the user device 102, or over a different network. The computer system 116 of the card payment network can communicate in turn with a computer system 118 of a card issuer, e.g., a bank. There can also be computer systems of other entities, e.g., the card acquirer, between the payment service system 108 and the card issuer. However, it should be noted that the present technology is not limited to financial transactions using credit or debit cards. The use of credit or debit cards is presented here solely for illustrative purposes. Therefore, the present disclosure contemplates that other types of financial instruments can be used as well. In such cases, the payment service system 108 would communicate with the appropriate entities to effect any necessary transfer of funds.

Before a transaction between the user and the merchant can be performed using the payment service system, the user must create a user account with the payment service system 108 and the merchant must create a merchant account with the payment service system 108.

The user can sign up using a mobile application or using an online Website, and can use any of mobile devices 102a, 102b or another computing device, e.g., a home computer. At some point prior to the transaction, a user application is downloaded to the user devices 102a and 102b, e.g., through an application store. Creation of the user account can be handled through the user application, or through another application, e.g., a generic Web browser. The user enters a name, account password, and contact information, e.g., email address. Before a transaction can be performed, the user also enters financial account information sufficient to conduct the transaction into the payment service system 108. For example, in the case of a credit card account, the user can enter the credit card issuer, credit card number and expiration date into the payment service system 108; the card validation value and mailing address can also be required. However, the financial account could also be associated with a debit card or pre-paid card, or another third party financial account.

Once a user and merchant have established accounts with the payment service system 108, they are able to begin transaction sessions and process payments as needed. In some configurations, a user for one of mobile device 102a, 102b can arrive at a location associated with the merchant. Thereafter the user can check-in with the payment service system 108 to establish a transaction session that identifies the merchant, the user, and, in some cases, the credit card or other financial instrument to be used for the transaction session. In some configurations, this can involve the user actively operating his device to initiate the transaction session manually. In other configurations, the check-in can be automatically performed by an application on the user's device or the payment service system, 108 upon detecting the location of the device and the merchant coincide. The check-in can result in forwarding of information regarding the customer to the merchant POS terminal 104a, at which point the merchant can utilize the information to conduct the transaction session with the user and request payment to perform and complete a financial transaction.

In some implementations, the payment service system 108 requires additional personal identifying information before a transaction can be performed. For example, the payment service system 108 can require a photo of the user before a transaction can be performed. The photo of the user would be provided to the merchant so that the merchant can compare the photo to the person. In addition, the payment service system 108 can require a personal identification number (PIN) be entered by the user. Other requirements can also be added to increase security. The data associated with a user account 114 can be stored at the secure server 112, e.g., in a database.

If the user is signing up with a mobile application, the user's financial account information can be entered by swiping the financial transaction card through a slot of a card reader coupled to the mobile device. Alternatively, the user can enter in financial account information by typing in information at the mobile devices 102a, 102b, selecting a card from an application on the mobile device, from an online entity, or others. In some implementations, another external application generates a receipt that is sent to the user. The receipt then includes a hypertext link that allows a user to easily create a user account in the payment service system. For example, activating the link in the receipt can automatically create a user account with a payment card prefilled with the card used in the receipt to reduce effort by the user. In effect, activating a new account using a receipt auto-verifies the user into the payment service system.

The merchant can sign up for an account using a terminal 104a of merchant system 104 or another device. The merchant enters a name, account password, and contact information, e. g., email address, and physical location information, e.g., an address, into the payment service system 108. The merchant can also provide other information, e.g., a list of goods or services available, operating hours, phone number, a small identifying image logo or mark, to the payment service system 108. The data associated with the merchant account 114 can be stored at the secure server 112, e.g., in a database.

At some point prior to the transaction, a merchant application is downloaded to the merchant system 104, e.g., through an application store. Creation of the merchant account can be handled through the merchant application, or through another application, e.g., a generic Web browser.

Eventually, in order to receive funds from the transaction, the merchant will need to enter financial account information into the payment service system 108 sufficient to receive funds. For example, in the case of a bank account, the user can enter the bank account number and routing number. However, the merchant's financial account can also be associated with a credit card account or another third party financial account. In addition, in some implementations, if the merchant has not entered the financial account information, the cardless payment processor can hold the received funds until the financial account information is provided.

In operation for processing payments, the system 100 can operate in a variety of ways. In some implementations, the process can be automated. Therefore, whenever the user device 102 is within a pre-defined range of the merchant system 104, the user device 102 and merchant system 104 can automatically begin communicating with each other and payment service system 108 to verify the customer and allow subsequent transactions to be performed automatically as the customer and the merchant enter information into their respective devices and systems. In other implementations, a manual process can be used for allowing the customer or merchant to be prompted so as to authorize any or all communications with their respective devices or to authorize any transactions. It is contemplated that the amount of automatic actions taken can be adjusted by the merchant or the customer as needed.

In addition to managing transaction and account information for customers and merchants, the application server 112 can also be configured to serve as an aggregating server for aggregating customer transaction information, assembling customer profiles and information based on such information, and interacting with merchants to communicate such information or merchant program information relevant to such information.

In particular, information from a merchant system 104, such as transaction information stored at database 104b, can also be stored at payment service system 108 and managed by application server 112. This information can be synchronized such that changes in database 104b are reflected in the stored information at payment service system 108. The customer transaction information can then be stored within application server 110 or even as part of merchant account 114. However, in some implementations, the management of customer transaction information can be handled at payment service system separately. That is, the aggregating server can be provided using an application server and storage (not shown), separate from application server 112 and merchant accounts 114.

Thereafter, upon receipt of a request to provide customer information from merchant system 104, the application server 112 can access information for the customer with regards to previous transactions with the merchant (or the merchant's partners, if applicable), and generate a customer profile. As noted above, in some instances the customer profile, or portions thereof, can be provided to the merchant system 104. In other instances, the application server 112 can access a merchant program database 120 and compare the customer profile to profiles for merchant programs to determine recommendations and other information to provide to the merchant.

It should be noted that while the merchant program database 120 is shown as part of payment service system in FIG. 1, it is contemplated that the location of the merchant program database and manner of access can vary. For example, in some implementations, the merchant program database can be separate from the payment service system 108 and accessed over network 106 as needed. In other implementations, merchant program information can be stored within each merchant system 104. Thus, when a request is forwarded to payment service system 108, the program information for the merchant can also be forwarded to the payment service system 108 at that time.

The relationship between the payment service system 108 and the merchant system 104 to provide customer information aggregation and recommendation services can be established at the time the merchant account 114 is established. However, in some implementations, this relationship can be established afterwards. For example, these services can be offered by payment service system 108 as an additional service for merchants which can be added or removed at any time.

Now that a description of some general concepts have been discussed, the description turns to a discussion of various implementations of the present technology. In particular, various implementations for managing customer information for merchants.

Figure 2:
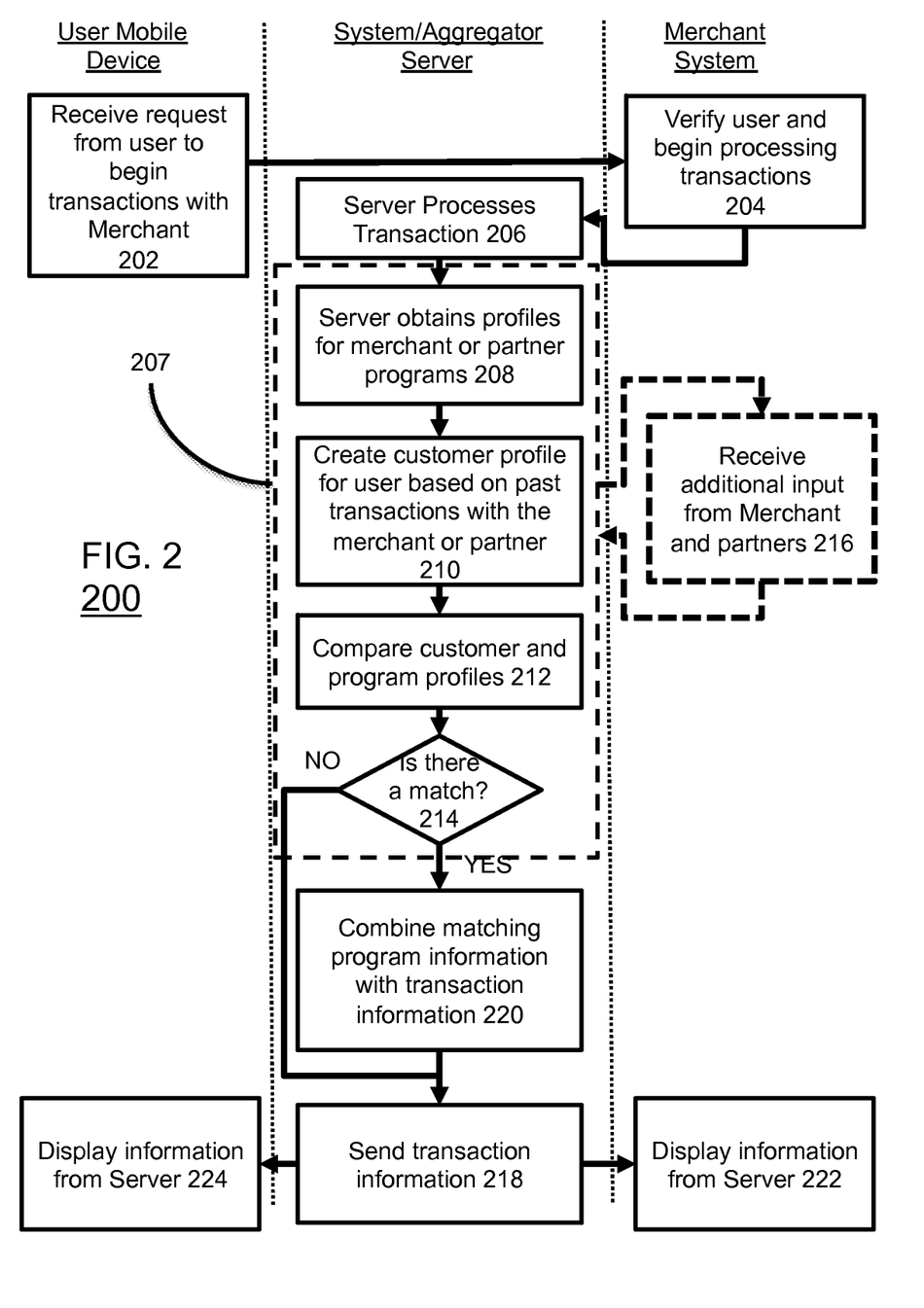
FIG. 2 is a flow chart of steps in an exemplary method for aggregating customer information and recommending merchant programs in accordance with the present technology.

At FIG. 2 there is provided a flow chart of steps in an exemplary method 200 for managing customer information for merchants. For ease of illustration and discussion, FIG. 2 is organized among steps perform at a user mobile device (e.g., user mobile devices 102a or 102b), steps performed at a merchant device (e.g., merchant system 104), and steps performed at a system/aggregating server (e.g., payment service system. 108).

Method 200 begins at steps 202 and 204 with a customer requesting a transaction and a merchant verifying the customer and beginning the transaction, respectively. In the case of a payment service system, this can be the initial exchange between devices to signal the beginning of a transaction session or even an exchange between devices to effect payment of a bill at the merchant. For example, the exchange between a user mobile device and a merchant device at a restaurant to place orders or pay a bill.

In response to this exchange the merchant device communicates with the system/aggregating server during the verification process of step 204 and the server processes the transaction at step 206. As noted above, this communication between the merchant device and the system/aggregating server can also serve as a request to aggregate customer information and provide recommendations with respect to merchant program. Accordingly, contemporaneously with step 206, the system/aggregating server can also perform process 207 to perform such aggregation and to generate recommendations for customers.

Process 207 begins with the system/aggregating server obtaining profiles associated with programs for the merchant or even the merchant's partners at step 208. As noted above, the profiles can be stored at a database within or otherwise accessible to the system/aggregating server. Alternatively, the merchant program information can be forwarded to the system/aggregating server as part of the merchant's original request.

In the various implementations, the profiles for the merchant programs can be selected to represent a profile of an "ideal" customer or customers for the merchant program. That is, the features or characteristics in the profile for the merchant profile correspond to a profile of such "ideal" customers. However, such profiles can be configured in a variety of ways. In one exemplary configuration, the profile can simply be a range or a minimum number of counts associated with a variety of categories of events. For example, a minimum number of visits, a minimum number of purchases of certain items, or a minimum number of bills exceeding a certain amount. Additionally, temporal or geographic conditions can be placed on such counts. In another exemplary configuration, the profile can simply provide a series of categories indicating the types of customer transaction behaviors desired for the customer profile. In still another example, the profile can provide a series of values with respect to a series of categories that indicate or characterize the types of customer transaction behaviors desired for the customer profile. Other configurations for profiles for merchant programs can also be used.

It is contemplated that the features included in a profile for a particular merchant program can be selected in a variety of ways. In some implementations, a generic program profile can be generated. That is, the categories, count-types, or other features or characteristics used in the customer profile can be the same for all types of merchants and merchant programs. However, even when merchants and merchant programs are similar, they can wish to operate their merchant programs differently. Therefore, alternatively or in combination with the generic profile, the particular categories, count-types, and other features or characteristics can be specified on a per-merchant, per-merchant-type, or per-program basis.

Contemporaneously with step 208, the system/aggregating server can create a customer profile at step 210 for the customer associated with the user mobile device. As noted above, the customer profile can be any type of record or information regarding the customer's attributes or trends, including past behaviors or preferences with respect to the merchant.

As previously noted, a customer profile is assembled in two steps. First, customer transactions are identified. In the various implementations, this can be accomplished by searching for transactions associated with some type of identifying information that is provided to the system/aggregating server. Thus, when this identifying information is received, relevant transactions from the merchant or his partners can be identified by system/aggregating server. Additionally, as also previously noted, the identifier provided to the system/aggregating server can also be used to determine other identifiers associated with the customer. For example, if a customer utilizes multiple credit cards, the system/aggregating server can be aware of both credit card numbers associated with the customer. Thus, when a request from the merchant device identifies only one credit card number, the information at the system/aggregating server associating the two credit card numbers can be used to identify additional transactions. Similarly, other types of transactions (e.g., cash-based, checks, or digital wallet) can be identified.

In some implementations, the system/aggregating server can collect information regarding any and all transactions associated with the customer and the merchant. However, in other implementations, it can be more useful to collect transaction information associated with a particular period of time or particular types of transactions. Thus, the system/aggregating server can be configured to retrieve only a limited set of all transactions. This can be specified in a variety of ways. In one example, the selection of transactions can be based on pre-defined settings at the system/aggregating server. In another example, this can be a function of the merchant programs. That is, if the merchant program requires examining transactions within a certain period of time, geographic location, or some other limitation, then the transactions used for the customer profile would be limited in this regard. In the case of a restaurant, the merchant program can only consider visits to the restaurant within the past year, purchases of certain menu items, bills totaling $50 or more, or the like to consider whether the customer qualifies for a merchant program. Thus, the transactions retrieved would be limited to these qualifying transactions. In yet other implementations, a combination of the system/aggregating server settings with the merchant program settings can be used to identify transactions from a merchant. For example, a base set of features can be specified at the system/aggregating server level and additional details can be specified at the merchant level.

In some implementations, as noted above, the transaction information is not necessarily limited to that of the merchant involved in the current transaction. In such implementations, the merchant can be partnered with other merchants so that the merchant programs encourage the customer to support not only the merchant, but his partners. Thus, the transactions collected for the customer profile can include transactions from such partners as well. It is also contemplated that in certain implementations, the transactions from partners can be limited to certain types of transactions. For example, if a merchant and a partner provide different sets of goods and services, the system/aggregating server can be configured to identify transactions solely from those that overlap or are related to the goods and services provided by the merchant. In the various implementations, the identification of partners and partner transactions to consider can be specified in a variety of ways. In one example, the merchant program can specify partners and transactions. In another example, there can be pre-defined logic at the system/aggregating server for identifying partners and transactions. However, it is also contemplated that a combination of methods can be utilized (merchant-side and system/aggregating server-side) to determine appropriate partner transactions for the customer profile.

The second step in the creation of the customer profile at step 210 involves the assembly of the profile itself. In the various implementations, this can be performed in a variety of ways. In one exemplary configuration, the profile can simply be a number of counts associated with a variety of categories of events. For example, number of visits, number of purchases of certain items, or number of bills exceeding a certain amount. Additionally, temporal or geographic conditions can be placed on such counts. In another exemplary configuration, the profile can simply provide a series of categories applicable to the customer based on the behaviors in the transactions. In still another example, the profile can provide a series of values with respect to a series of categories applicable to the customer based on the behaviors in the transactions. Other types of methods for assembling values for a profile can be used as well, including combinations of different types of values.

It is contemplated that the makeup of a customer profile can be selected in a variety of ways. In some implementations, a generic customer profile can be generated. That is, the categories, count-types, or the like used in the customer profile can be the same for all merchants or merchants of a same type. However, even when merchants are in similar businesses or are of a similar type, the profile of interest can vary based on merchant needs or exactly how the merchant program is setup. Therefore, alternatively or in combination with the generic profile, the particular categories, count-types, and the like for a merchant-specific profile can be selected on a per-merchant basis or per-merchant-type basis. These profiles can be setup a priori with the system/aggregating server, can be generated based on the merchant programs for the merchant, or can be provided at the time of the request. However, it is also contemplated that the merchant and the customer profiles can not have the same sets of features or characteristics.

Once the customer profile is created at step 210, the customer and merchant profiles can be compared at step 212 and action can be taken at step 214 based on whether or not there is a match.

At steps 212 and 214, the process for comparing profiles and determining whether a match exists can be performed in a variety of ways. In one implementation, a match of all features of the profiles can be required. In another implementation, a minimum number of matching features can be specified for determining there is a match. These can be specific features requiring matching, a minimum total number of features requiring matching, or both. In yet other implementations, where the customer profile consists of values, a score can be computed and used, separately or in combination with the above, to determine whether there is a match. In some cases, the score can be computed using weighted values such that values and categories of greater importance to the merchant for the merchant program are identified. However, the various implementations are not limited to any particular methodology for determining a match and other methods can be used, depending on the types of profiles being compared.

If there is no match at step 214, then the system/aggregating server proceeds to step 218 to deliver transaction information to the merchant and, optionally, the customer. If there is a match at step 214 of at least one merchant program to the customer profile, then information for the merchant program associated with the match can be added to the transaction information at step 220 prior to step 218. The information can be configured based on the merchant program that matches. For example, in the case of a loyalty program, the information can include an application or basic information for the customer to join. In the case of a discount program, the information can include a coupon or code for a discount.

Figure 3:
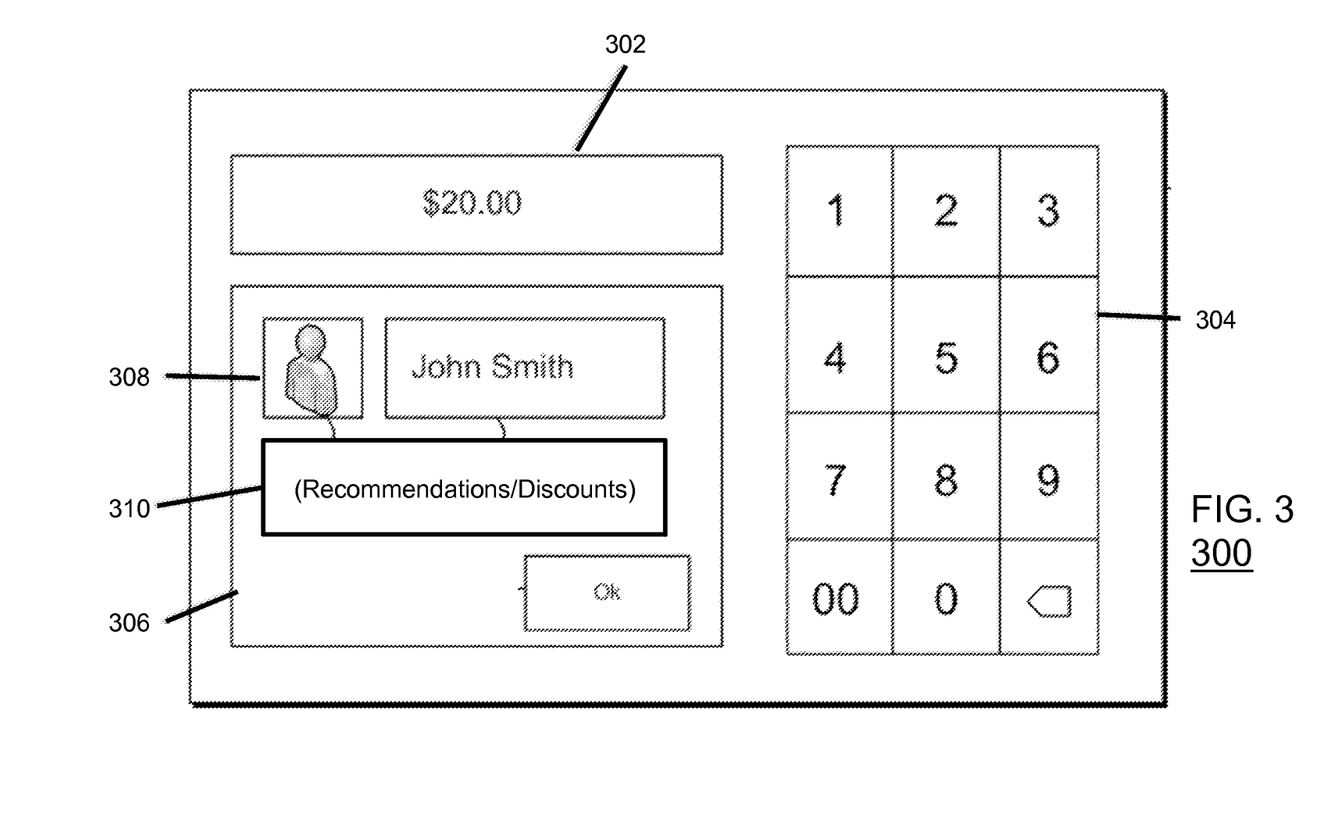
FIGS. 3 and 4 show views of an exemplary merchant terminal configured in accordance with the present technology in accordance with the present technology.

At step 218, the transaction information, including the merchant program information, can then be forwarded to the POS terminal. In some implementations, the POS terminal is the merchant device, as shown at step 222. For example, FIG. 3 shows an exemplary merchant POS terminal interface 300. The interface 300 includes a transaction display portion 302 for displaying transaction information, a keypad 304 or other input device for inputting transaction information, including customer information, and a customer display portion 306 for displaying customer information. As shown in FIG. 3, the customer display portion 306 can include a user information portion 308 and a merchant program information portion 310. In the customer display portion 306, basic information regarding the customer can be presented. In the merchant program information portion 310, specific information regarding merchant programs for the customer or links thereto can be presented. For example, recommendations for specific loyalty programs can be provided. In another example, discounts available for the customer can also be provided.

Figure 4:
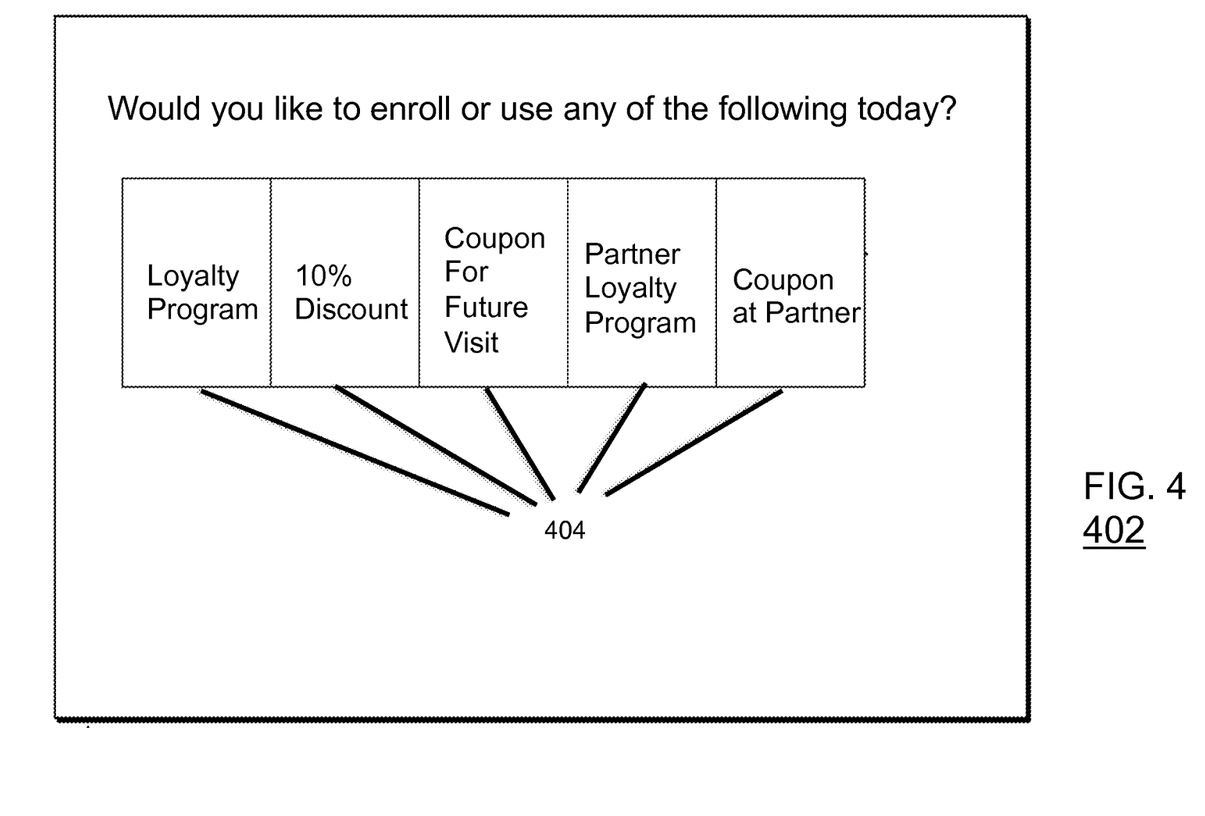

In one particular implementation, the merchant program information portion 310 can display or link to the various merchant programs available to the customer. An exemplary display 402 of such merchant programs is shown in FIG. 4. As shown in FIG. 4, the display 402 of merchant programs can indicate various programs and benefits 404 that are available to the customer based on the matching of the customer to merchant programs. These can include, as shown in FIG. 4, loyalty programs, discounts, coupons, loyalty programs with merchant partners, and coupons with merchant partners, to name a few. In other instances, based on the matching and the available merchant programs, more or less programs can be presented than shown in FIG. 4, including other merchant programs not shown. Thereafter, the merchant's agent can select one or more of the programs for the customer.

Referring back to FIG. 2, it is also contemplated that in other implementations, such as in a payment service system, the user mobile device can also serve as a POS terminal that operates separately or in coordination with the merchant device. Thus, at step 224, the information regarding the transaction can be received there as well. In this implementation, the customer can then directly act on the proposed merchant programs instead of requiring merchant action to do so.

Figure 5:
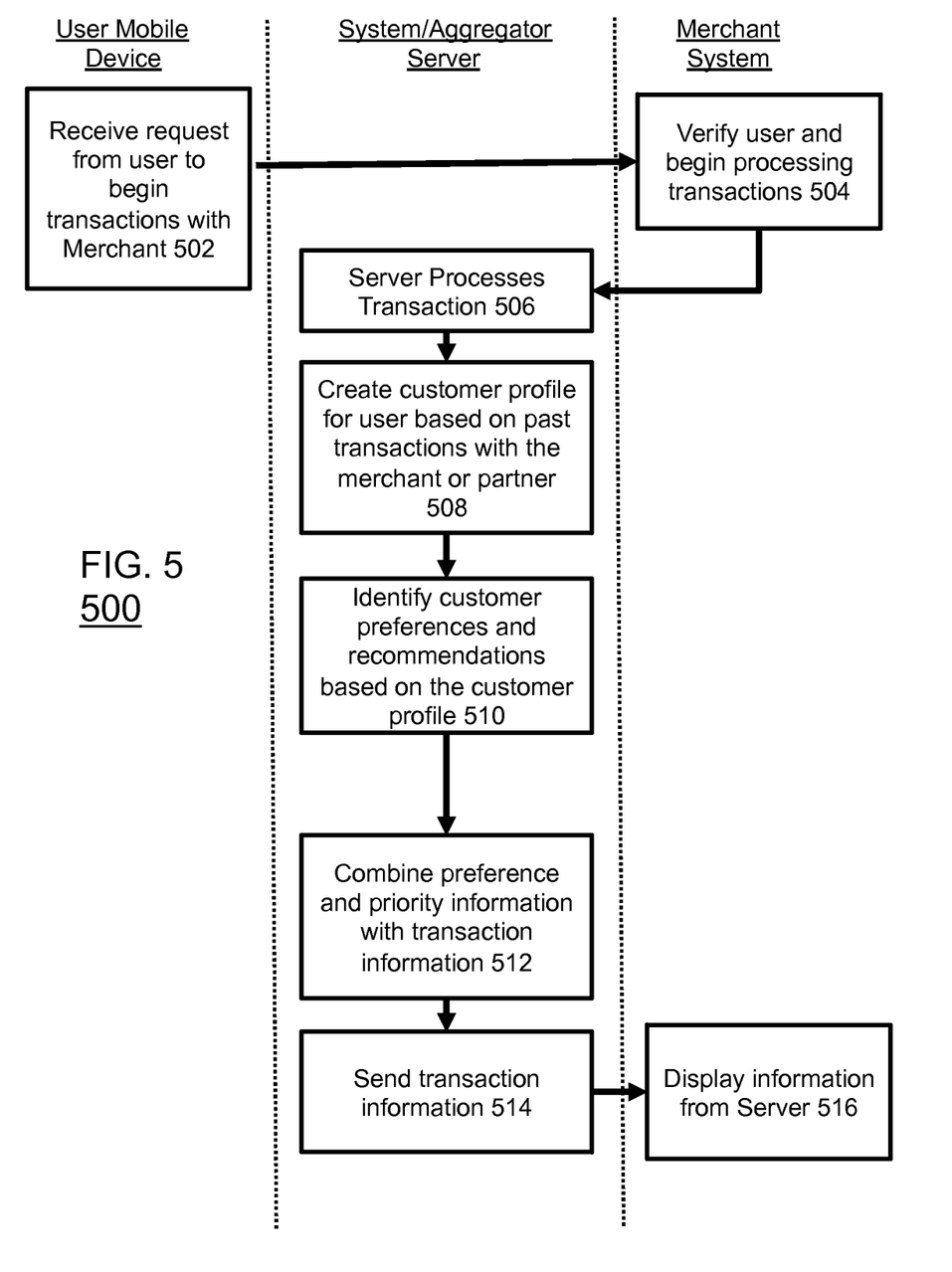
FIG. 5 is a flow chart of steps in an exemplary method for managing customer information in accordance with the present technology.

As noted above, the aggregation methods described above can also be used to assist the merchant in improving customer service. This is illustrated below with respect to FIG. 5. FIG. 5 is a flow chart of steps in an exemplary method 500 for managing customer information for merchants. For ease of illustration and discussion, FIG. 5 is organized among steps perform at a user mobile device (e.g., user mobile devices 102*a* or 102*b*), steps performed at a merchant system (e.g., merchant system 104), and steps performed at a system or aggregating server (e.g., payment service system. 108).

Method 500 with steps 502, 504, and 506 in which a transaction or transaction session between a customer and a merchant is initiated, similar to steps 202, 204, and 206 in FIG. 2. Thereafter, at step 508, a customer profile can be created for the customer. This customer profile can be created in a manner substantially similar to that described above for creating a customer profile at step 210 of FIG. 2. As noted above, the customer profile can be any type of record or information regarding the customer's attributes or trends, including past behaviors or preferences with respect to the merchant.

Once the customer profile is created at step 510, customer preferences and recommendations can be generated at step 512. In the various implementations, such preferences and recommendations can be generated in a variety of ways.

For example, in some implementations, the preferences and recommendations can be generated similar to the method by which merchant programs are identified for the customer in FIG. 2. That is, certain goods and services can be associated with a goods and services profile for the merchant. For example, the profile for recommending certain goods and services can be a profile for an "ideal" customer or customers that would be normally be interested in the particular goods or services. This profile can then be compared to the customer profile. If there is a match with the customer profile, then the goods and services would be identified as suitable for a recommendation to the user. In other implementations, the customer profile can be configured with features that each match to different preference types and have associated values or characteristics for each feature. Thus, the values or characteristic for such features can be inputted to a mapping or decision logic that determines whether a certain good or service should be offered to the customer.

This comparison process can also be utilized to dissuade the customer from selecting certain goods and services. That is, if the match is poor, there is a strong likelihood that the customer will be dissatisfied with the selection. Thus, the lack of or the poor match between the customer and a particular good or service can also be identified so that the merchant can take appropriate action to improve the customer's experience.

Alternatively or in addition to a matching process, a counting, thresholding, or tendency process can also be used to identify preferences and recommendation for the customer. For example, if the transactions indicate certain customer tendencies or high counts with respect to certain goods and services previously purchased by the customer, these tendencies and high counts can be identified. Alternatively, if the customer profile indicates certain numbers of purchases of certain goods and services over a period of time, these goods and services can be identified as being recommended. Similarly, other types of counts can be used with threshold or minimum values to determine preferred goods and services for the customer. Moreover, if certain counts or tendencies correlate to tendencies and preferences of other customers with respect to other goods and services, these other goods and services associated with these tendencies and preferences can also be identified.

In addition to recommendations and preferences of goods and services, the recommendations can also indicate possible customer service improvement opportunities notifications for the merchant's agents. For example, if the customer frequents the merchant's establishment, the customer can be identified as being a loyal or high value customer. In another example, if the customer tends to spend large amounts at the merchant's establishment, the customer can be identified as a premium customer. In some implementations, the frequency of visits, expenditures, and other behaviors can be used to categorize the customer. For example, the customer can be categorized as platinum, silver, or gold level by the merchant based on their behaviors. Thus, merchant's agents can then adjust service levels according to this categorization. Additionally, categorizations can be used to improve service. For example, if a customer is identified as historically tipping low, in general or which respect to certain merchant agents, these merchant agents can be put on alert that the customer can have exceptionally high service standards.

Once the customer preferences and recommendations are identified at step 510, the method can proceed to step 514 in which the recommendation and preference information is added to the transaction information. At step 516, the transaction information, along with recommendation and preference information, is sent to merchant system. Finally, at step 518, the recommendation and preference information is displayed at the merchant POS terminal for use by the merchants' agents. This is illustrated with respect to FIG. 6.

Figure 6:
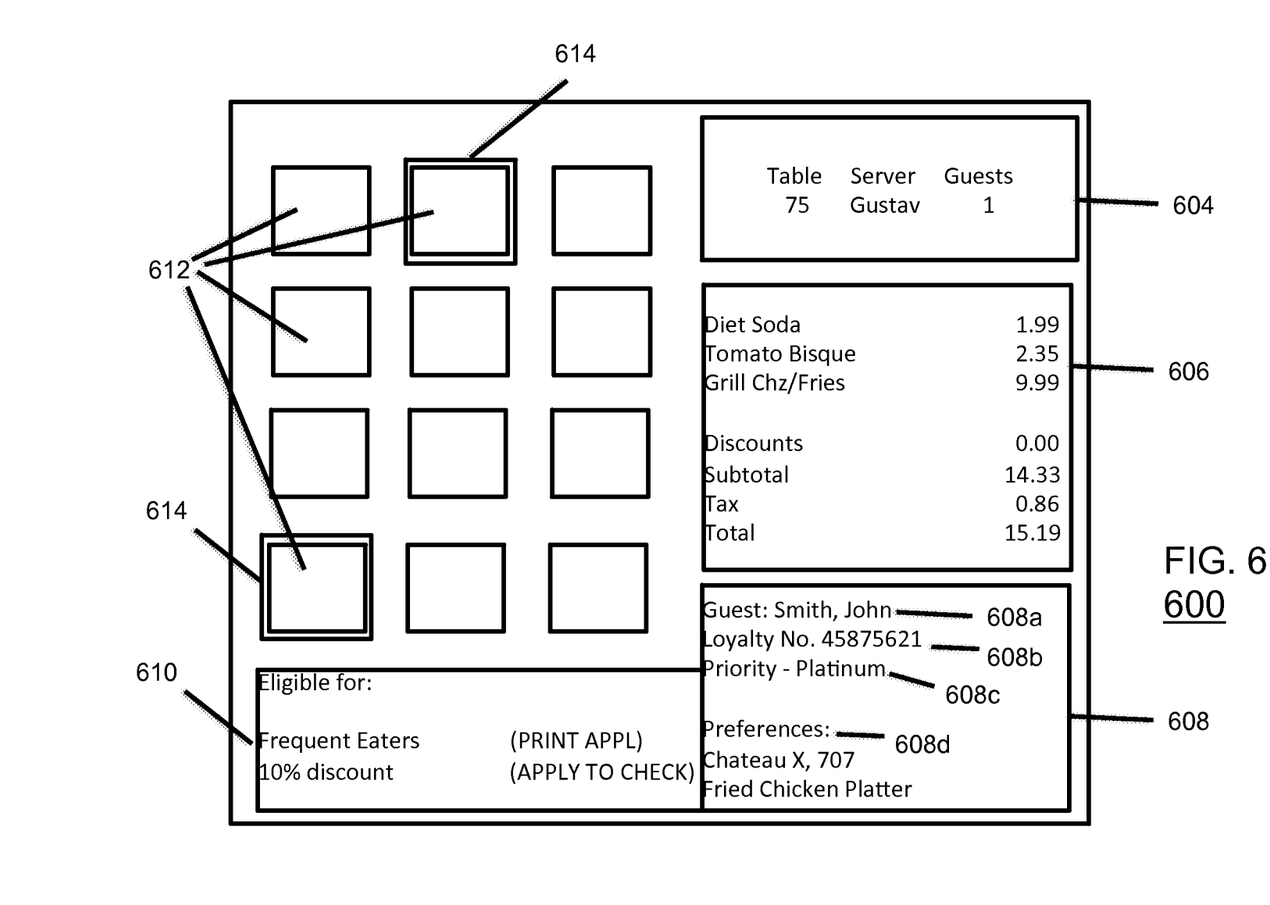
FIG. 6 shows a views of an exemplary merchant terminal configured in accordance with the present technology in accordance with the present technology.

FIG. 6 shows an exemplary merchant POS terminal display 600 configured for managing customer information in a restaurant setting. The POS terminal display 600 includes a item selection portion 602, table information portion 604, billing portion 606, customer information portion 608, and a merchant program portion 610. The selection portion 602 is configured for allowing the merchant agent to select items to add or delete form the customer's bill. The table information portion can be used to display the table being currently managed in the POS terminal display 600. The billing portion 606 can be used to display goods and services for the customer and the total running bill. The customer information portion 608 can be used to display information regarding the customer. Finally, the merchant program portion 610 can be utilized to identify merchant programs for the customer. This portion can be populated as previously described with respect to FIGS. 2, 3, and 4.

In the implementation of FIG. 6, the customer information portion 608 can be configured to display identifying information for the customer, such as customer name 608*a* and a customer identifier 608*b*, e.g., a loyalty program number. However, in addition to such identifying information, the preference and recommendation information can also be displayed here. For example, as shown in FIG. 6, the customer information portion 608 can also display a service or priority level 608*c* (e.g. "platinum") and customer preferences or recommendations 608*d* (e.g., food and drink recommendations). However, the various implementations are not limited to displaying just this information and more or less information than shown can be provided.

Additionally, recommendation and preference information can not be limited solely to the customer information portion 608. In some implementations, the POS terminal display 600 can be configured to provide other indicia for the merchant agent to quickly and easily identify the customer's preferences. For example, as shown in FIG. 6, the selection portion can be configured with a plurality of items 612 representing goods and services available from the merchant. Further, as also shown in FIG. 6, preferences or recommendations for the customer can include a highlight 614 or other indicia to indicate items that are preferred or recommended for the user. In some instances, the highlight 614 or indicia can be different for preferred versus recommended items.

Although the various implementations have been discussed primarily with respect to operation of a restaurant, the various implementations described herein are also suitable for any other types of merchants.

Figure 7:
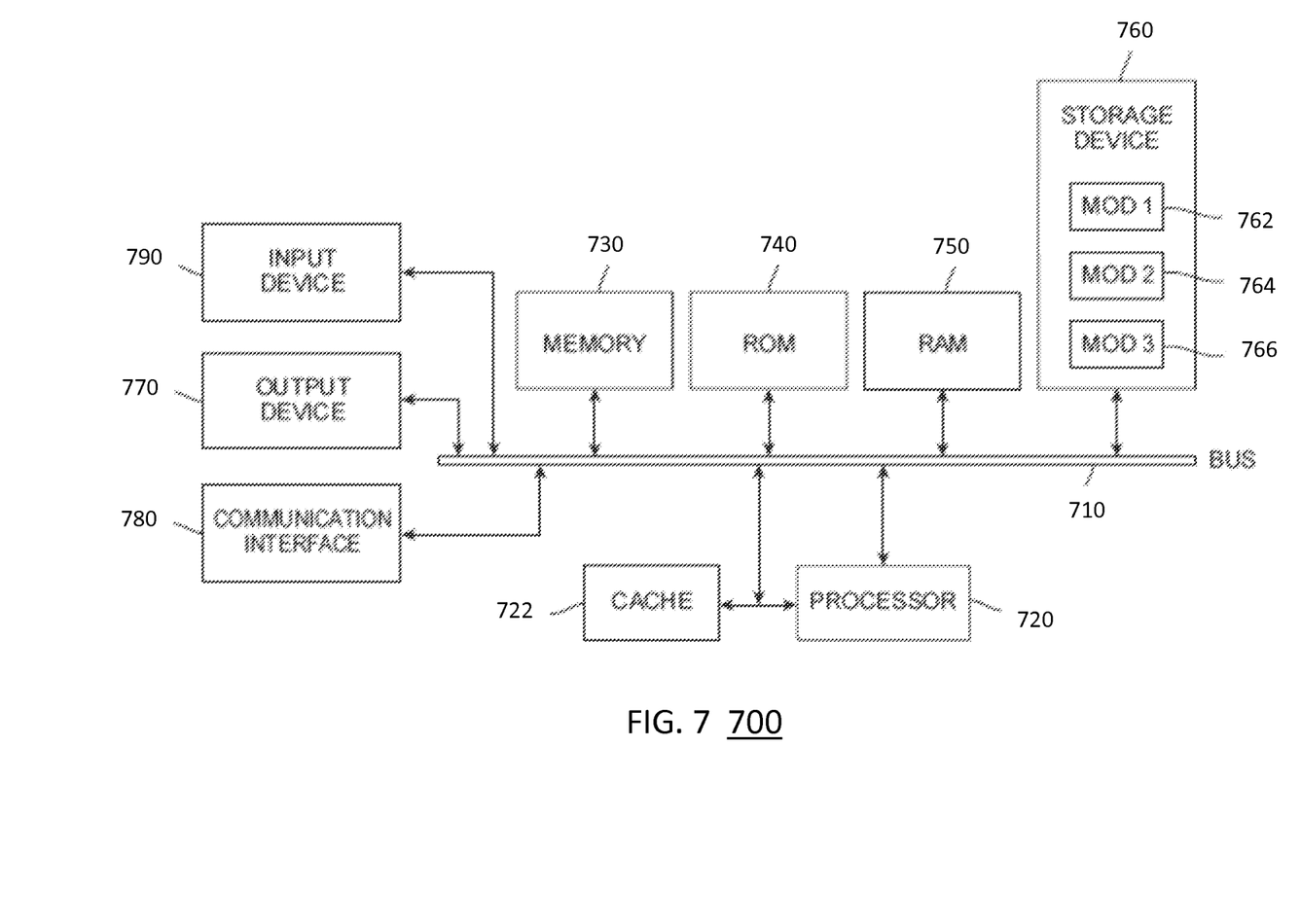
FIG. 7 illustrates an exemplary system that can be configured to implement one or more aspects of the present technology.

FIG. 7 illustrates an exemplary system 700 that includes a general-purpose computing device 700, including a processing unit (CPU or processor) 720 and a system bus 710 that couples various system components including the system memory 730 such as read only memory (ROM) 740 and random access memory (RAM) 750 to the processor 720.

The system 700 can include a cache 722 of high speed memory connected directly with, in close proximity to, or integrated as part of the processor 720. The system 700 copies data from the memory 730 and/or the storage device 760 to the cache 722 for quick access by the processor 720. In this way, the cache 722 provides a performance boost that avoids processor 720 delays while waiting for data. These and other modules can control or be configured to control the processor 720 to perform various actions. Other system memory 730 can be available for use as well. The memory 730 can include multiple different types of memory with different performance characteristics. It can be appreciated that the disclosure can operate on a computing device 700 with more than one processor 720 or on a group or cluster of computing devices networked together to provide greater processing capability. The processor 720 can include any general purpose processor and a hardware module or software module, such as module 7 762, module 2 764, and module 3 766 stored in storage device 760, configured to control the processor 720 as well as a special-purpose processor where software instructions are incorporated into the actual processor design. The processor 720 can essentially be a completely self-contained computing system, containing multiple cores or processors, a bus, memory controller, cache, etc. A multi-core processor can be symmetric or asymmetric.

The system bus 710 can be any of several types of bus structures including a memory bus or memory controller, a peripheral bus, and a local bus using any of a variety of bus architectures. A basic input/output (BIOS) stored in ROM 740 or the like, can provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer readable storage media provide nonvolatile storage of computer readable instructions, data structures, program modules and other data for the computing device 700. In one aspect, a hardware module that performs a particular function includes the software component stored in a non-transitory computer-readable medium in connection with the necessary hardware components, such as the processor 720, bus 710, display 7200, and so forth, to carry out the function. The basic components are known to those of skill in the art and appropriate variations are contemplated depending on the type of device, such as whether the device 700 is a small, handheld computing device, a desktop computer, or a computer server.

Although the exemplary implementation described herein employs the hard disk 760, it should be appreciated by those skilled in the art that other types of computer readable media which can store data that are accessible by a computer, such as magnetic cassettes, flash memory cards, digital versatile disks, cartridges, random access memories (RAMs) 750, read only memory (ROM) 740, a cable or wireless signal containing a bit stream and the like, can also be used in the exemplary operating environment. Non-transitory computer-readable storage media expressly exclude media such as energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 7200 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic features here can easily be substituted for improved hardware or firmware arrangements as they are developed.

For clarity of explanation, the illustrative system implementation is presented as including individual functional blocks including functional blocks labeled as a "processor" or processor 720. The functions these blocks represent can be provided through the use of either shared or dedicated hardware, including, but not limited to, hardware capable of executing software and hardware, such as a processor 720, that is purpose-built to operate as an equivalent to software executing on a general purpose processor. For example, the functions of one or more processors presented in FIG. 7 can be provided by a single shared processor or multiple processors. (Use of the term "processor" should not be construed to refer exclusively to hardware capable of executing software.) Illustrative implementations can include microprocessor and/or digital signal processor (DSP) hardware, read-only memory (ROM) 740 for storing software performing the operations discussed below, and random access memory (RAM) 750 for storing results. Very large scale integration (VLSI) hardware implementations, as well as custom VLSI circuitry in combination with a general purpose DSP circuit, can also be provided.

The logical operations of the various implementations are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 700 shown in FIG. 7 can practice all or part of the recited methods, can be a part of the recited systems, and/or can operate according to instructions in the recited non-transitory computer-readable storage media. Such logical operations can be implemented as modules configured to control the processor 720 to perform particular functions according to the programming of the module. For example, FIG. 7 illustrates three modules Mod1 762, Mod2 764 and Mod3 766 which are modules configured to control the processor 720. These modules can be stored on the storage device 760 and loaded into RAM 750 or memory 730 at runtime or can be stored as would be known in the art in other computer-readable memory locations.

It should be noted that any of the components shown in FIG. 7 can be distributed over multiple connected systems, or be local as shown, or be remote to a connected terminal interface, or any combination.

While specific implementations of the present technology of this application have been described above, it should be understood that they have been presented by way of example only, and not limitation. Numerous changes to the disclosed implementation can be made in accordance with the disclosure herein without departing from the spirit or scope of the present technology of this application. Thus, the breadth and scope of the present technology should not be limited by any of the above-described implementations. Rather, the scope of the present technology should be defined in accordance with the following claims and their equivalents.

Although the present technology has been illustrated and described with respect to one or more implementations, equivalent alterations and modifications will occur to others skilled in the art upon the reading and understanding of this specification and the annexed drawings. In addition, while a particular feature of the present technology can have been disclosed with respect to only one of several implementations, such feature can be combined with one or more other features of the other implementations as can be desired and advantageous for any given or particular application.

The terminology used herein is for the purpose of describing particular implementations only and is not intended to be limiting of the present technology. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which the present technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method comprising:
    tracking, by a payment service provider, transactions between a plurality of customers and a plurality of merchants conducted at a plurality of point-of-sale (POS) terminals associated with the plurality of merchants, to create records of transactions;
    receiving, by the payment service provider, a request from a merchant POS terminal of a merchant in association with a current transaction with a customer device, the request including customer identifying information;
    identifying, by the payment service provider, a customer trend for a customer associated with the customer device, the customer trend being identified based on the customer identifying information and the records of transactions;
    determining, by the payment service provider, that the customer trend matches a threshold, wherein the threshold is one or more of a minimum number of visits to the merchant and a minimum number of purchases from the merchant by the customer in association with the current transaction;
    generating, by the payment service provider and based on determining that the customer trend matches the threshold, instructions for at least one incentive to be applied to the current transaction at the POS terminal; and
    processing, by the payment service provider, the transaction with one or more of the at least one incentive applied thereto.

2. The method of claim 1, further comprising:
    sending, by the payment service provider for display on the merchant POS terminal during the current transaction, the instructions for the at least one incentive to the merchant POS terminal, wherein processing the current transaction is triggered upon receiving a request from the POS terminal to process the transaction and a selection of the one or more of the at least one incentive.

3. The method of claim 1, wherein the customer trend matches the threshold for the at least one incentive.

4. The method of claim 1, wherein identifying the customer trend comprises:
    detecting at least one alternate identity for the customer and available to the payment service provider; and
    supplementing the records of past transactions with past transactions associated with the at least one alternate identity for the customer.

5. The method of claim 1, wherein the at least one incentive comprises at least one of purchase recommendations to make to the customer, discounts to apply to the current transaction, or loyalty programs to recommend to the customer.

6. The method of claim 1, wherein the threshold is further based on a minimum dollar amount spent.

7. A payment service system comprising:
    memory having computer-readable instructions stored therein; and
    one or more processors configured to execute the computer-readable instructions to:
        receive, from a first terminal, a request for processing a transaction using the first terminal and a second terminal, the first terminal being associated with a merchant, the second terminal being associated with a customer;
        determine records of past transactions associated with the customer using customer identifying information received as part of the request for processing the transaction, the records of past transactions corresponding to transactions conducted by the customer at a plurality of point-of-sale (POS) devices associated with a plurality of merchants;
        determine a match between the records of past transactions and a threshold, wherein the threshold is one or more of a minimum number of visits to the merchant and a minimum number of purchases from the merchant by the customer in association with the transaction;
        determine at least one sale recommendation to be associated with the transaction based on the match between records of past transactions and the threshold; and
        process the transaction based on the at least one sale recommendation.

8. The payment service system of claim 7, wherein the one or more processors are configured to:
    determine at least one trend in the records of past transactions that identifies at least one purchasing preference of the customer that is relevant to the transaction; and
    determine the at least one sale recommendation based on the match between the at least one trend and the threshold, wherein the at least one recommendation comprises at least one of purchase recommendations to make to the customer, discounts to apply to the transaction, or loyalty programs to recommend to the customer.

9. The payment service system of claim 8, wherein the one or more processors are configured to:
    detect at least one alternate identity for the customer and available to the payment service system; and determine the at least one trend based on the records of past transactions and a record of past transactions associated with the at least one alternate identity for the customer.

10. The payment service system of claim 7, wherein the one or more processors are further configured to execute the computer-readable instructions to:
  track transactions between the customer and one or more merchants to create the records of past transactions for the customer.

11. The payment service system of claim 7, wherein the one or more processors are configured to execute the computer-readable instructions to process the transaction after receiving a request from the first terminal to process the transaction and a selection of one or more of the at least sale recommendation.

12. The payment service system of claim 7, wherein each of the customer and the merchant has a respective registered profile with the payment service system that includes at least respective payment information of the customer and the merchant.

13. The payment service system of claim 7, wherein the threshold is further based on a minimum dollar amount spent.

14. One or more non-transitory computer-readable media comprising computer-readable instructions, which when executed by one or more processors of a payment service system, cause the one or more processors to:
  receive, from a first terminal, a request for processing a transaction using the first terminal and a second terminal, the first terminal being associated with a merchant, the second terminal being associated with a customer;
  determine records of past transactions associated with the customer using customer identifying information received as part of the request for processing the transaction, the records of past transactions corresponding to transactions conducted by the customer at a plurality of point-of-sale (POS) devices associated with a plurality of merchants;
  determine a match between the records of past transactions and a threshold, wherein the threshold is one or more of a minimum number of visits to the merchant and a minimum number of purchases from the merchant by the customer in association with the transaction;
  determine at least one sale recommendation to be associated with the transaction based on the match between the records of past transactions and the threshold; and
  process the transaction based on the at least one sale recommendation.

15. The one or more non-transitory computer-readable media of claim 14, wherein the execution of the computer-readable instructions by the one or more processors, cause the one or more processors to:
  determine at least one trend in the records of past transactions that identifies at least one purchasing preference of the customer that is relevant to the transaction; and
  determine the at least one sale recommendation based on the match between the at least one trend and the threshold, wherein the at least one recommendation comprises at least one of purchase recommendations to make to the customer, discounts to apply to the transaction, or loyalty programs to recommend to the customer.

16. The one or more non-transitory computer-readable media of claim 15, wherein the execution of the computer-readable instructions by the one or more processors, cause the one or more processors to:
  detect at least one alternate identity for the customer and available to the payment service system; and
  determine the at least one trend based on the records of past transactions and a record of past transactions associated with the at least one alternate identity for the customer.

17. The one or more non-transitory computer-readable media of claim 14, wherein the execution of the computer-readable instructions by the one or more processors, cause the one or more processors to:
  track transactions between the customer and one or more merchants to create the records of past transactions for the customer.

18. The one or more non-transitory computer-readable media of claim 14, wherein the execution of the computer-readable instructions by the one or more processors, cause the one or more processors to process the transaction after receiving a request from the first terminal to process the transaction and a selection of one or more of the at least sale recommendation.

19. The one or more non-transitory computer-readable media of claim 14, wherein each of the customer and the merchant has a respective registered profile with the payment service system that includes at least respective payment information of the customer and the merchant.

20. The one or more non-transitory computer-readable media of claim 14, wherein the threshold is further based on a minimum dollar amount spent.

* * * * *